United States Patent
Lee

(10) Patent No.: US 9,128,641 B2
(45) Date of Patent: Sep. 8, 2015

(54) PARAMETER SETTING APPARATUS AND METHOD FOR AUTOMOTIVE OPEN SYSTEM ARCHITECTURE-BASED SOFTWARE

(71) Applicant: Electronics and Telecommunications Research Institute, Daejeon (KR)

(72) Inventor: Joo-Chul Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 13/928,716

(22) Filed: Jun. 27, 2013

(65) Prior Publication Data

US 2014/0068548 A1     Mar. 6, 2014

(30) Foreign Application Priority Data

Aug. 31, 2012   (KR) ........................ 10-2012-0096500

(51) Int. Cl.
    *G06F 9/44*           (2006.01)
(52) U.S. Cl.
    CPC ... *G06F 8/10* (2013.01); *G06F 8/20* (2013.01)
(58) Field of Classification Search
    None
    See application file for complete search history.

(56) References Cited

U.S. PATENT DOCUMENTS

| | | | | |
|---|---|---|---|---|
| 2007/0288885 | A1* | 12/2007 | Brunel et al. | 717/104 |
| 2010/0162203 | A1* | 6/2010 | Kim et al. | 717/105 |
| 2010/0292867 | A1* | 11/2010 | Bohm et al. | 701/1 |
| 2012/0072198 | A1* | 3/2012 | Aknin et al. | 703/21 |
| 2012/0159436 | A1* | 6/2012 | Morgan et al. | 717/120 |
| 2012/0167045 | A1* | 6/2012 | Jeon et al. | 717/121 |
| 2012/0177135 | A1* | 7/2012 | Gahinet et al. | 375/260 |

FOREIGN PATENT DOCUMENTS

KR    10-2010-0071361 A     6/2010

* cited by examiner

*Primary Examiner* — Don Wong
*Assistant Examiner* — Devayani R Talukdar
(74) *Attorney, Agent, or Firm* — Rabin & Berdo, P.C.

(57) ABSTRACT

The present invention discloses a parameter setting apparatus and method for AUTOSAR-based software, which may lead a user to set parameters at suitable times depending on the variant attributes of parameters. In the parameter setting method, a selection of a variant attribute of a parameter of a metamodel defined to design AUTOSAR-based software is received from a user. If the variant attribute selected by the user corresponds to a variant-pre-compile attribute, setting of only a parameter having the variant-pre-compile attribute is allowed. If the variant attribute selected by the user corresponds to a variant-link attribute, setting of only a parameter having either one of the variant-pre-compile attribute and the variant-link attribute is allowed. If the variant attribute selected by the user corresponds to a variant-post-build attribute, setting of only a parameter having any one of the variant-pre-compile attribute, the variant-link attribute, and the variant-post-build attribute is allowed.

20 Claims, 6 Drawing Sheets

PARAMETER SETTING APPARATUS AND METHOD FOR AUTOMOTIVE OPEN SYSTEM ARCHITECTURE-BASED SOFTWARE

CROSS REFERENCE TO RELATED APPLICATIONS

This application claims the benefit of Korean Patent Application No. 10-2012-0096500, filed on Aug. 31, 2012, which is hereby incorporated by reference in its entirety into this application.

BACKGROUND OF THE INVENTION

1. Technical Field

The present invention relates generally to a parameter setting apparatus and method for AUTomotive Open System ARchitecture (AUTOSAR)-based software and, more particularly, to a parameter setting apparatus and method for AUTOSAR-based software, which may lead a user to set corresponding parameters at suitable time points depending on variant attributes of parameters set by an AUTOSAR-supporting development tool.

2. Description of the Related Art

Recently, owing to vehicle drivers' desires, legal, environmental, and social requirements, and environmental and technical efforts of vehicle manufactures, electric/electronic systems and software areas in all types of vehicles have varied. Consequently, for drivers' desires to enjoy Information Technology (IT) even in vehicles and for the safety and convenience of the drivers, electronic devices and software for operating them have become more and more complicated.

That is, an Electronic Control Unit (ECU) has performed the functionalities of information systems such as navigation or telematics, and the functionalities of vehicle body control, a power train system, engine control, and safety device control. The number of ECUs has gradually increased, and software has also expanded and become complicated. In order to overcome this complication, some ECUs are required to operate in cooperation with other ECUs, thus resulting in a situation in which wiring required for such cooperation has increased in geometrical progression. Consequently, in order to solve such a wiring problem for communication and the complication of software, and reduce faults, it is intended to establish AUTomotive Open System ARchitecture (AUTOSAR) standards and then solve the above problems.

In particular, AUTOSAR defines architectures for automotive electronics software, development methodology, Application Program Interfaces (APIs) for respective electronics applications, etc. Automotive electronics software architectures provided by AUTOSAR include the structures of applications, network architectures/communication data between ECUs on which applications are to be installed, the structures and setting methods of lower platform modules that support application software loaded into individual ECUs, etc. In order to implement such standards in actual software, AUTOSAR defines and provides metamodels required to describe products produced by each development methodology. In relation to this, Korean Unexamined Patent Publication No. 2010-0071361 discloses project management technology for software architecture modeling tools of AUTOSAR application software.

Parameters of products defined in the metamodels are set by an AUTOSAR configuration tool. Here, each of the parameters must be set at any one of three time points, that is, a pre-compile-time, a link-time, and a post-build-time, depending on the time point of setting. Such time points are designated as the attributes of parameters. In this case, AUTOSAR defines variant attributes depending on methods of configuring basic software (BSW) loaded into each ECU upon developing applications. Such variant attributes correspond to a kind of pre-set in which parameter subsets to be configured at specific time points among the parameters of a metamodel required for the design of a specific basic software module are predefined.

Such variant attributes are generally defined as variant-pre-compile, variant-link, or variant-post-build attributes. Here, parameters having a variant-pre-compile attribute must be set at a pre-compile-time, parameters having a variant-link attribute must be set at a pre-compile-time or at a link-time, and parameters having a variant-post-build attribute must be set at any one of a pre-compile-time, a link-time, and a post-build-time.

However, conventional management technologies for the software architecture modeling tools of AUTOSAR application software disclosed in Korean Unexamined Patent Publication No. 2010-0071361 do not provide a method of leading a user to set the corresponding parameters at suitable time points depending on the variant attributes of the parameters of a metamodel.

SUMMARY OF THE INVENTION

Accordingly, the present invention has been made keeping in mind the above problems occurring in the prior art, and an object of the present invention is to provide a parameter setting apparatus and method for AUTOSAR-based software, which may lead a user to set corresponding parameters at suitable time points depending on the variant attributes of parameters set by an AUTOSAR-supporting development tool.

In accordance with an aspect of the present invention to accomplish the above object, there is provided a parameter setting method for Automotive Open System ARchitecture (AUTOSAR)-based software, including receiving a selection of a variant attribute of a parameter of a metamodel defined to design AUTOSAR-based software from a user; if the variant attribute selected by the user corresponds to a variant-pre-compile attribute, allowing setting of only a parameter having the variant-pre-compile attribute; if the variant attribute selected by the user corresponds to a variant-link attribute, allowing setting of only a parameter having either one of the variant-pre-compile attribute and the variant-link attribute; and if the variant attribute selected by the user corresponds to a variant-post-build attribute, allowing setting of only a parameter having any one of the variant-pre-compile attribute, the variant-link attribute, and the variant-post-build attribute.

Preferably, allowing the setting of only the parameter having either one of the variant-pre-compile attribute and the variant-link attribute may include receiving a selection of a setting of the parameter having either one of the variant-pre-compile attribute and the variant-link attribute from the user.

Preferably, allowing the setting of only the parameter having either one of the variant-pre-compile attribute and the variant-link attribute may further include, if the selection of the setting of the parameter corresponds to a selection of a setting of the parameter having the variant-pre-compile attribute, blocking setting of parameters other than the parameter having the variant-pre-compile attribute.

Preferably, allowing the setting of only the parameter having either one of the variant-pre-compile attribute and the variant-link attribute may further include, if the selection of the setting of the parameter corresponds to a selection of a setting of the parameter having the variant-link attribute, checking whether setting of all parameters having the variant-pre-compile attribute has been completed.

Preferably, allowing the setting of only the parameter having either one of the variant-pre-compile attribute and the variant-link attribute may further include, if the setting of all parameters having the variant-pre-compile attribute has not yet been completed, requesting the user to set all parameters having the variant-pre-compile attribute.

Preferably, allowing the setting of only the parameter having either one of the variant-pre-compile attribute and the variant-link attribute may further include, if the setting of all parameters having the variant-pre-compile attribute has been completed, blocking setting of parameters other than the parameter having the variant-link attribute.

Preferably, allowing the setting of only the parameter having any one of the variant-pre-compile attribute, the variant-link attribute, and the variant-post-build attribute may include receiving a selection of a setting of the parameter having any one of the variant-pre-compile attribute, the variant-link attribute, and the variant-post-build attribute from the user.

Preferably, allowing the setting of only the parameter having any one of the variant-pre-compile attribute, the variant-link attribute, and the variant-post-build attribute may further include, if the selection of the setting of the parameter corresponds to a selection of a setting of the parameter having the variant-pre-compile attribute, blocking setting of parameters other than the parameter having the variant-pre-compile attribute.

Preferably, allowing the setting of only the parameter having any one of the variant-pre-compile attribute, the variant-link attribute, and the variant-post-build attribute may further include, if the selection of the setting of the parameter corresponds to a selection of a setting of the parameter having the variant-link attribute, checking whether setting of all parameters having the variant-pre-compile attribute has been completed.

Preferably, allowing the setting of only the parameter having any one of the variant-pre-compile attribute, the variant-link attribute, and the variant-post-build attribute may further include, if the setting of all parameters having the variant-pre-compile attribute has not yet been completed, requesting the user to set all parameters having the variant-pre-compile attribute.

Preferably, allowing the setting of only the parameter having any one of the variant-pre-compile attribute, the variant-link attribute, and the variant-post-build attribute may further include, if the setting of all parameters having the variant-pre-compile attribute has been completed, blocking setting of parameters other than the parameter having the variant-link attribute.

Preferably, allowing the setting of only the parameter having any one of the variant-pre-compile attribute, the variant-link attribute, and the variant-post-build attribute may further include, if the selection of the setting of the parameter corresponds to a selection of a setting of the parameter having the variant-post-build attribute, checking whether setting of all parameters having the variant-pre-compile attribute or the variant-link attribute has been completed.

Preferably, allowing the setting of only the parameter having any one of the variant-pre-compile attribute, the variant-link attribute, and the variant-post-build attribute may further include, if the setting of all parameters having the variant-pre-compile attribute or the variant link attribute has not yet been completed, requesting the user to set all parameters having the variant-pre-compile attribute or the variant-link attribute.

Preferably, allowing the setting of only the parameter having any one of the variant-pre-compile attribute, the variant-link attribute, and the variant-post-build attribute may further include, if the setting of all parameters having the variant-pre-compile attribute or the variant link attribute has been completed, blocking setting of parameters other than the parameter having the variant-post-build attribute.

In accordance with another aspect of the present invention to accomplish the above object, there is provided a parameter setting apparatus for Automotive Open System ARchitecture (AUTOSAR)-based software, including a user selection input unit configured to receive a selection of a variant attribute of a parameter of a metamodel defined to design AUTOSAR-based software from a user; a variant selection determination unit configured to determine whether the variant attribute selected by the user corresponds to any one of a variant-pre-compile attribute, a variant-link attribute, and a variant-post-build attribute; and a parameter setting management unit configured to, if the variant attribute selected by the user corresponds to the variant-pre-compile attribute, allow setting of only a parameter having the variant-pre-compile attribute, if the variant attribute selected by the user corresponds to the variant-link attribute, allow setting of only a parameter having either one of the variant-pre-compile attribute and the variant-link attribute, and if the variant attribute selected by the user corresponds to the variant-post-build attribute, allow setting of only a parameter having any one of the variant-pre-compile attribute, the variant-link attribute, and the variant-post-build attribute.

Preferably, the user selection input unit may receive a selection of a setting of the parameter having any of the variant-pre-compile attribute, the variant-link attribute, and the variant-post-build attribute from the user.

Preferably, the parameter setting management unit may include a parameter setting selection determination unit for determining whether the selection of the setting of the parameter corresponds to a selection of a setting of the parameter having any one of the variant-pre-compile attribute, the variant-link attribute, and the variant-post-build attribute.

Preferably, the parameter setting management unit may further include a parameter setting completion checking unit configured to, if the selection of the setting of the parameter corresponds to a selection of a setting of the parameter having the variant-link attribute, check whether setting of all parameters having the variant-pre-compile attribute has been completed, and if the selection of the setting of the parameter corresponds to a selection of a setting of the parameter having the variant-post-build attribute, check whether setting of all parameters having the variant-pre-compile attribute or the variant-link attribute has been completed.

Preferably, the parameter setting completion checking unit may be configured to, if the selection of the setting of the parameter corresponds to the selection of the setting of the parameter having the variant-link attribute, and setting of all parameters having the variant-pre-compile attribute has not yet been completed, request the user to set all parameters having the variant-pre-compile attribute, and if the selection of the setting of the parameter corresponds to the selection of the setting of the parameter having the variant-post-build attribute, and setting of all parameters having the variant-pre-compile attribute or the variant-link attribute has not yet been completed, request the user to set all parameters having the variant-pre-compile attribute or the variant-link attribute.

Preferably, the parameter setting management unit may further include a parameter setting blocking unit for blocking setting of parameters other than a parameter having a corresponding variant attribute depending on the selection of the setting of the parameter.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
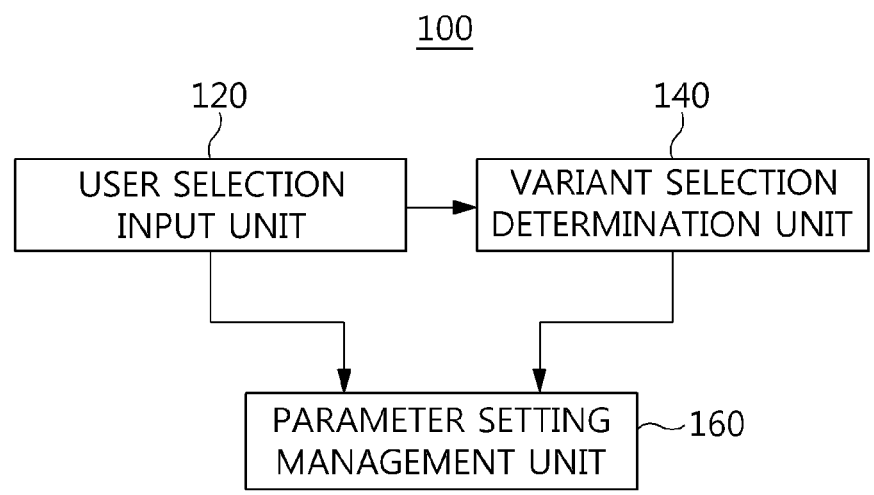
FIG. 1 is a diagram showing the configuration of a parameter setting apparatus for AUTOSAR-based software according to the present invention.

Hereinafter, a parameter setting apparatus and method for AUTOSAR-based software according to embodiments of the present invention will be described with reference to the attached drawings. Prior to the detailed description of the present invention, it should be noted that the terms or words used in the present specification and the accompanying claims should not be limitedly interpreted as having their common meanings or those found in dictionaries. Therefore, the embodiments described in the present specification and constructions shown in the drawings are only the most preferable embodiments of the present invention, and are not representative of the entire technical spirit of the present invention. Accordingly, it should be understood that various equivalents and modifications capable of replacing the embodiments and constructions of the present invention might be present at the time at which the present invention was filed.

Hereinafter, the configuration and operation of a parameter setting apparatus for AUTomotive Open System ARchitecture (AUTOSAR)-based software according to the present invention will be described in detail with reference to FIGS. 1 and 2.

FIG. 1 is a diagram showing the configuration of a parameter setting apparatus for AUTOSAR-based software according to the present invention.

Referring to FIG. 1, a parameter setting apparatus 100 for AUTOSAR-based software according to the present invention includes a user selection input unit 120, a variant selection determination unit 140, and a parameter setting management unit 160.

The user selection input unit 120 receives a selection of a variant attribute of a parameter of a metamodel, defined to design AUTOSAR-based software, from a user. In this case, the variant attribute received from the user selection input unit 120 may correspond to one of variant-pre-compile, variant-link and variant-post-build attributes. In this case, the user selection input unit 120 transfers the variant attribute received from the user to the variant selection determination unit 140. Further, the user selection input unit 120 may receive from the user a selection regarding which one of a parameter having a variant-pre-compile attribute, a parameter having a variant-link attribute, and a parameter having a variant-post-build attribute is to be set, and transfer the selection to the parameter setting management unit 160.

The variant selection determination unit 140 receives the variant attribute selected by the user from the user selection input unit 120, and determines whether the variant attribute selected by the user corresponds to any one of variant-pre-compile, variant-link, and variant-post-build attributes. In this case, the variant selection determination unit 140 provides the results of the determination to the parameter setting management unit 160.

The parameter setting management unit 160 allows or blocks the user's setting of a parameter having a variant-pre-compile attribute, a parameter having a variant-link attribute, or a parameter having a variant-post-build attribute, based on the determination results provided by the variant selection determination unit 140 and the selection of the setting of the parameter provided by the user selection input unit 120. The parameter setting management unit 160 allows the setting of only the parameter having the variant-pre-compile attribute if the variant attribute indicative of the determination results provided by the variant selection determination unit 140 corresponds to variant-pre-compile, allows the setting of only the parameter having either one of the variant-pre-compile and variant-link attributes if the variant attribute corresponds to variant-link, and allows the setting of only the parameter having any one of the variant-pre-compile, variant-link, and variant-post-build attributes if the variant attribute corresponds to variant-post-build. More detailed configuration and operation of the parameter setting management unit 160 will be described below with reference to FIG. 2.

Figure 2:
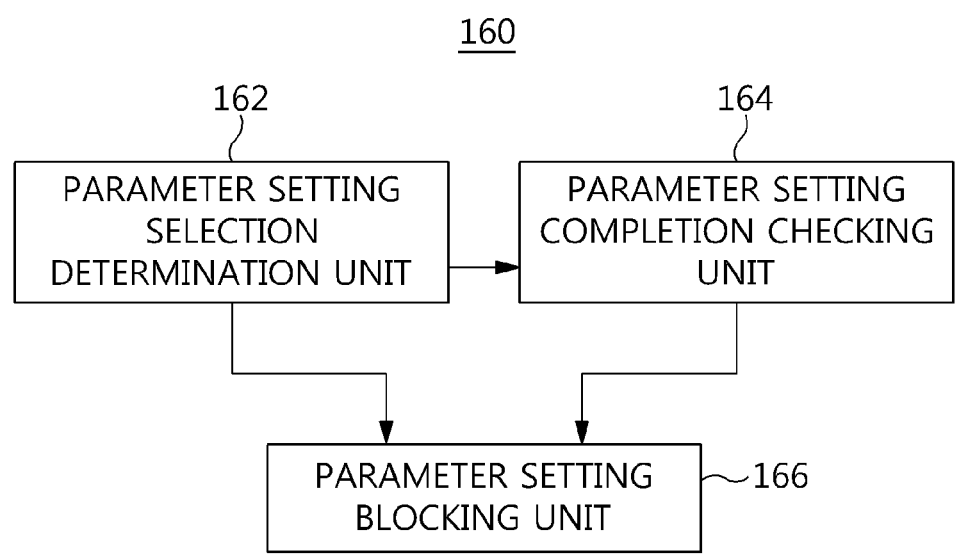
FIG. 2 is a diagram showing the configuration of the parameter setting management unit of FIG. 1.

FIG. 2 is a diagram showing the configuration of the parameter setting management unit 160 of FIG. 1.

Referring to FIG. 2, the parameter setting management unit 160 includes a parameter setting selection determination unit 162, a parameter setting completion checking unit 164, and a parameter setting blocking unit 166.

The parameter setting selection determination unit 162 determines to which one of a parameter having a variant-pre-compile attribute, a parameter having a variant-link attribute, and a parameter having a variant-post-build attribute the selection of the setting of the parameter provided by the user selection input unit 120 corresponds. In this case, the parameter setting selection determination unit 162 provides the results of the determination related to the selection of the setting of the parameter both to the parameter setting completion checking unit 164 and to the parameter setting blocking unit 166.

The parameter setting completion checking unit 164 is configured to, if the determination results provided by the variant selection determination unit 140 correspond to a variant attribute which is a variant-link attribute, and the determination results provided by the parameter setting selection determination unit 162 correspond to a selection of a setting of the parameter having the variant-link attribute, check whether the setting of all parameters having the variant-pre-compile attribute has been completed. In this case, if the setting of all parameters having the variant-pre-compile attribute has not yet been completed, the parameter setting completion checking unit 164 warns the user that the setting of all parameters having the variant-pre-compile attribute has not yet been completed, and requests the user to complete the setting of all parameters having the variant-pre-compile attribute. The above-described warning and request may be performed by visually displaying the warning and the request on a display unit (not shown) so that the user can check them. Further, the parameter setting completion checking unit 164 is configured to, if the determination results provided by the variant selection determination unit 140 correspond to a variant attribute which is a variant-post-build attribute and the determination results provided by the parameter setting selection determination unit 162 correspond to a selection of a setting of a parameter having a variant-link attribute, check whether the setting of all parameters having the variant-pre-compile attribute has been completed. In this case, if the setting of all parameters having the variant-pre-compile attribute has not yet been completed, the parameter setting completion checking unit 164 warns the user that the setting of all parameters having the variant-pre-compile attribute has not yet been completed, and requests the user to complete the setting of all parameters having the variant-pre-compile attribute. Meanwhile, the parameter setting completion checking unit 164 is configured to, if the determination results provided by the variant selection determination unit 140 correspond to a variant attribute which is a variant-post-build attribute, and the determination results provided by the parameter setting selection determination unit 162 correspond to a selection of a setting of the parameter having the variant-post-build attribute, check whether the setting of all parameters having the variant-pre-compile attribute or the variant-link attribute has been completed. In this case, if the setting of all parameters having the variant-pre-compile attribute or the variant-link attribute has not yet been completed, the parameter setting completion checking unit 164 warns the user that the setting of all parameters having the variant-pre-compile attribute or the variant-link attribute has not yet been completed, and requests the user to complete the setting of all parameters having the variant-pre-compile attribute or the variant-link attribute. The parameter setting completion checking unit 164 may provide the results of checking whether the setting of the above parameters has been completed to the parameter setting blocking unit 160.

The parameter setting blocking unit 166 is configured to, if the determination results provided by the variant selection determination unit 140 correspond to the variant attribute which is the variant-pre-compile attribute, block the setting of parameters other than parameters having the variant-pre-compile attribute so that the user cannot set the parameters.

Further, the parameter setting blocking unit 166 is configured to, if the determination results provided by the variant selection determination unit 140 correspond to the variant attribute which is the variant-link attribute, and the determination results provided by the parameter setting selection determination unit 162 correspond to a selection of a setting of the parameter having the variant-pre-compile attribute, block the setting of parameters other than the parameters having the variant-pre-compile attribute so that the user cannot set the parameters. Meanwhile, the parameter setting blocking unit 166 is configured to, if the determination results provided by the variant selection determination unit 140 correspond to the variant attribute which is the variant-link attribute, and the determination results provided by the parameter setting selection determination unit 162 correspond to a selection of a setting of the parameter having the variant-link attribute, receive the results of checking whether the setting of all parameters having the variant-pre-compile attribute has been completed from the parameter setting completion checking unit 164. In this case, if it is checked that the setting of all parameters having the variant-pre-compile attribute has been completed, the parameter setting blocking unit 166 blocks the setting of parameters other than the parameter having the variant-link attribute so that the user cannot set the parameters.

Furthermore, the parameter setting blocking unit 166 is configured to, if the determination results provided by the variant selection determination unit 140 correspond to the variant attribute which is the variant-post-build attribute, and the determination results provided by the parameter setting selection determination unit 162 correspond to a selection of a setting of the parameter having the variant-pre-compile attribute, block the setting of parameters other than the parameter having the variant-pre-compile attribute so that the user cannot set the parameters. Meanwhile, the parameter setting blocking unit 166 is configured to, if the determination results provided by the variant selection determination unit 140 correspond to the variant attribute which is the variant-post-build attribute, and the determination results provided by the parameter setting selection determination unit 162 correspond to a selection of a setting of the parameter having the variant-link attribute, receive the results of checking whether the setting of all parameters having the variant-pre-compile attribute has been completed from the parameter setting completion checking unit 164. In this case, if it is checked that the setting of all parameters having the variant-pre-compile attribute has been completed, the parameter setting blocking unit 166 blocks the setting of parameters other than the parameter having the variant-link attribute so that the user cannot set the parameters. Furthermore, the parameter setting blocking unit 166 is configured to, if the determination results provided by the variant selection determination unit 140 correspond to the variant attribute which is the variant-post-build attribute, and the determination results provided by the parameter setting selection determination unit 162 correspond to a selection of a setting of the parameter having the variant-post-build attribute, receive the results of checking whether the setting of all parameters having the variant-pre-compile attribute or the variant-link attribute has been completed from the parameter setting completion checking unit 164. In this case, if it is checked that the setting of all parameters having the variant-pre-compile attribute or the variant-link attribute has been completed, the parameter setting blocking unit 166 blocks the setting of parameters other than the parameters having the variant-pre-compile attribute or the variant-link attribute so that the user cannot set the parameters. In this case, when the multiplicity of a parameter container corresponding to a parameter configuration set is (1..1), the parameter setting blocking unit 166 may allow the addition of a parameter container. In this regard, parameters having variant attributes corresponding to variant-pre-compile and variant-link in a parameter container additionally generated from a second time may be displayed by copying the parameters of a first parameter container. In this case, the copied parameters having variant attributes corresponding to variant-pre-compile and variant-link are blocked so that the user cannot set the parameters. Further, when the multiplicity of a parameter container corresponding to a parameter configuration set is (1..*), the parameter setting blocking unit 166 prevents further parameter containers from being added.

Hereinafter, a parameter setting method for AUTOSAR-based software according to the present invention will be described with reference to FIGS. 3 to 6. Descriptions of some components overlapping the above operations of the parameter setting apparatus for AUTOSAR-based software, described above with reference to FIGS. 1 and 2, will be omitted.

Figure 3:
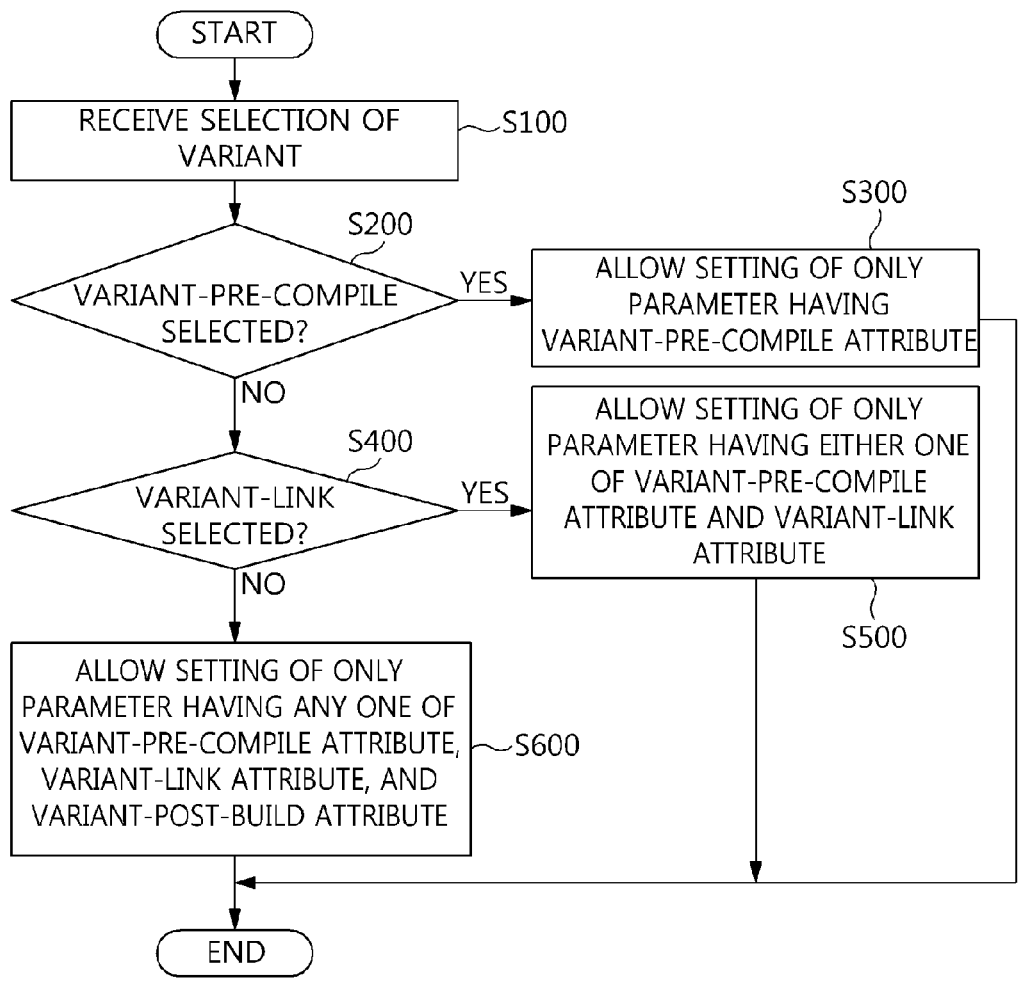
FIGS. 3 to 6 are flowcharts showing a parameter setting method for AUTOSAR-based software according to the present invention.

FIG. 3 is a flowchart showing a parameter setting method for AUTOSAR-based software according to the present invention.

Referring to FIG. 3, in the parameter setting method for AUTOSAR-based software according to the present invention, the user selection input unit 120 receives a selection of a variant attribute of a parameter of a metamodel defined to design AUTOSAR-based software from a user at step S100. In this case, the user selection input unit 120 transmits the variant attribute of the parameter received from the user to the variant selection determination unit 140.

Next, the variant selection determination unit 140 determines whether the variant attribute selected by the user corresponds to a variant-pre-compile attribute at step S200.

If it is determined at step S200 that the variant attribute selected by the user corresponds to the variant-pre-compile attribute, the parameter setting management unit 160 allows the setting of only the parameter having the variant-pre-compile attribute at step S300. In this case, the parameter setting management unit 160 blocks the user from setting a parameter having a variant-link attribute or a parameter having a variant-post-build attribute other than the parameter having the variant-pre-compile attribute. The operation of setting parameters and blocking the setting of parameters may be performed by the parameter setting blocking unit 166 of the parameter setting management unit 160.

In contrast, if it is determined at step S200 that the variant attribute selected by the user does not correspond to the variant-pre-compile attribute, the variant selection determination unit 140 determines whether the variant attribute selected by the user corresponds to a variant-link attribute at step S400.

If it is determined at step S400 that the variant attribute selected by the user corresponds to the variant-link attribute, the parameter setting management unit 160 allows the setting of only the parameter having either one of the variant-pre-compile attribute and the variant-link attribute at step S500. In this case, the parameter setting management unit 160 blocks the user from setting a parameter having a variant-post-build attribute other than the parameter having the variant-pre-compile attribute or the parameter having the variant-link attribute.

In contrast, if it is determined at step S400 that the variant attribute selected by the user corresponds to the variant-post-build attribute without corresponding to the variant-link attribute, the parameter setting management unit 160 allows the setting of only the parameter having any one of the variant-pre-compile attribute, the variant-link attribute, and the variant-post-build attribute at step S600.

Figure 4:
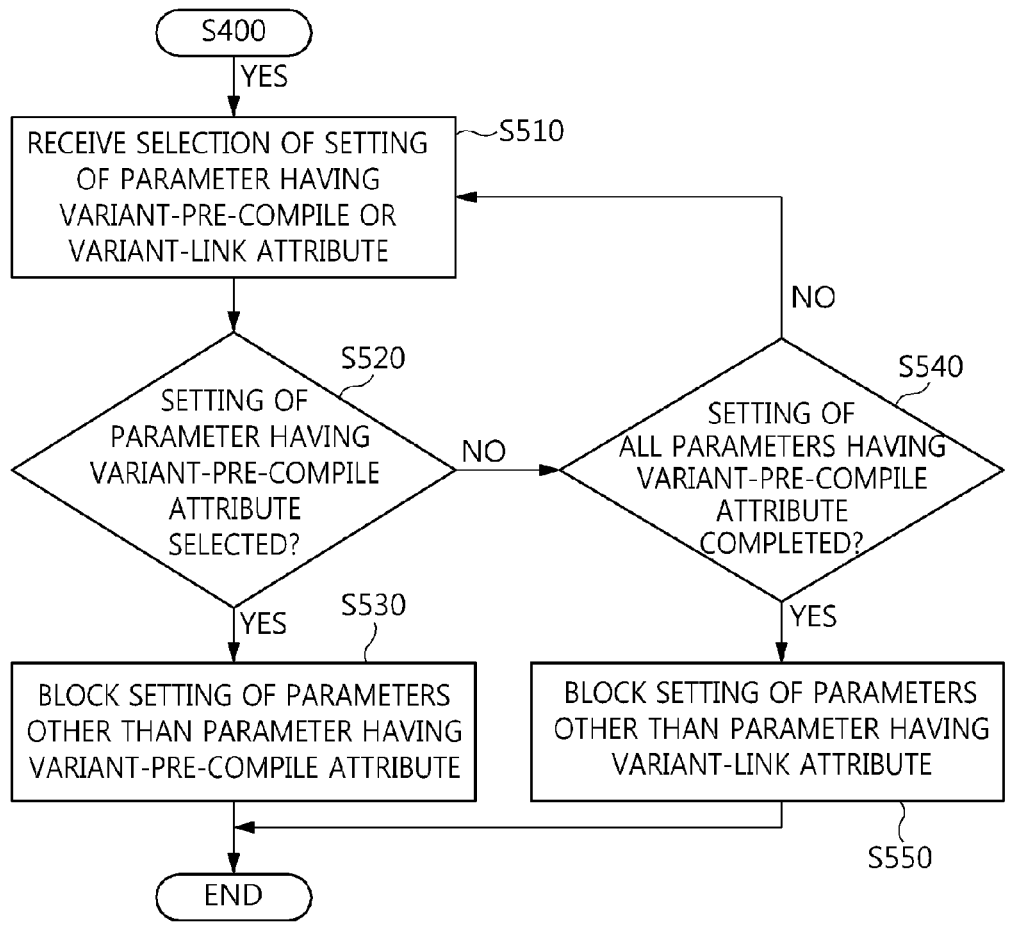

FIG. 4 is a flowchart showing step S500 of FIG. 3 in greater detail.

Referring to FIG. 4, step S500 is configured such that the user selection input unit 120 receives, from the user, a selection regarding which one of a parameter having a variant-pre-compile attribute and a parameter having a variant-link attribute is to be set at step S510. In this case, the user selection input unit 120 transmits the selection of the setting of the parameter received from the user to the parameter setting selection determination unit 162 of the parameter setting management unit 160.

Next, the parameter setting selection determination unit 162 determines whether the selection of the setting of a parameter provided by the user selection input unit 120 corresponds to a selection of a setting of the parameter having the variant-pre-compile attribute at step S520.

If it is determined at step S520 that the selection of the setting of the parameter corresponds to the selection required to set the parameter having the variant-pre-compile attribute, the parameter setting blocking unit 166 allows the user to set only the parameter having the variant-pre-compile attribute, and blocks the user from setting a parameter having a variant-link attribute or a parameter having a variant-post-build attribute other than the parameter having the variant-pre-compile attribute at step S530.

If it is determined at step S520 that the selection of the setting of the parameter corresponds to the selection required to set a parameter having a variant-link attribute other than the parameter having the variant-pre-compile attribute, the parameter setting completion checking unit 164 checks whether the setting of all parameters having the variant-pre-compile attribute has been completed at step S540. In this case, if it is checked at step S540 that the setting of all parameters having the variant-pre-compile attribute has not yet been completed, the parameter setting completion checking unit 164 warns the user that the setting of all parameters having the variant-pre-compile attribute has not yet been completed, and requests the user to complete the setting of all parameters having the variant-pre-compile attribute which has not yet been completed. In order to set the parameters having the variant-pre-compile attribute, the setting of which has not yet been completed, the step S510 of the user selection input unit 120 receiving, from the user, the selection regarding which one of the parameter having the variant-pre-compile attribute and the parameter having the variant-link attribute is to be set may be performed again.

In contrast, if it is checked at step S540 that the setting of all parameters having the variant-pre-compile attribute has been completed, the parameter setting blocking unit 166 allows the user to set only the parameter having the variant-link attribute and blocks the user from setting parameters having the variant-pre-compile attribute or the variant-post-build attribute other than the parameter having the variant-link attribute at step S550.

Figure 5:
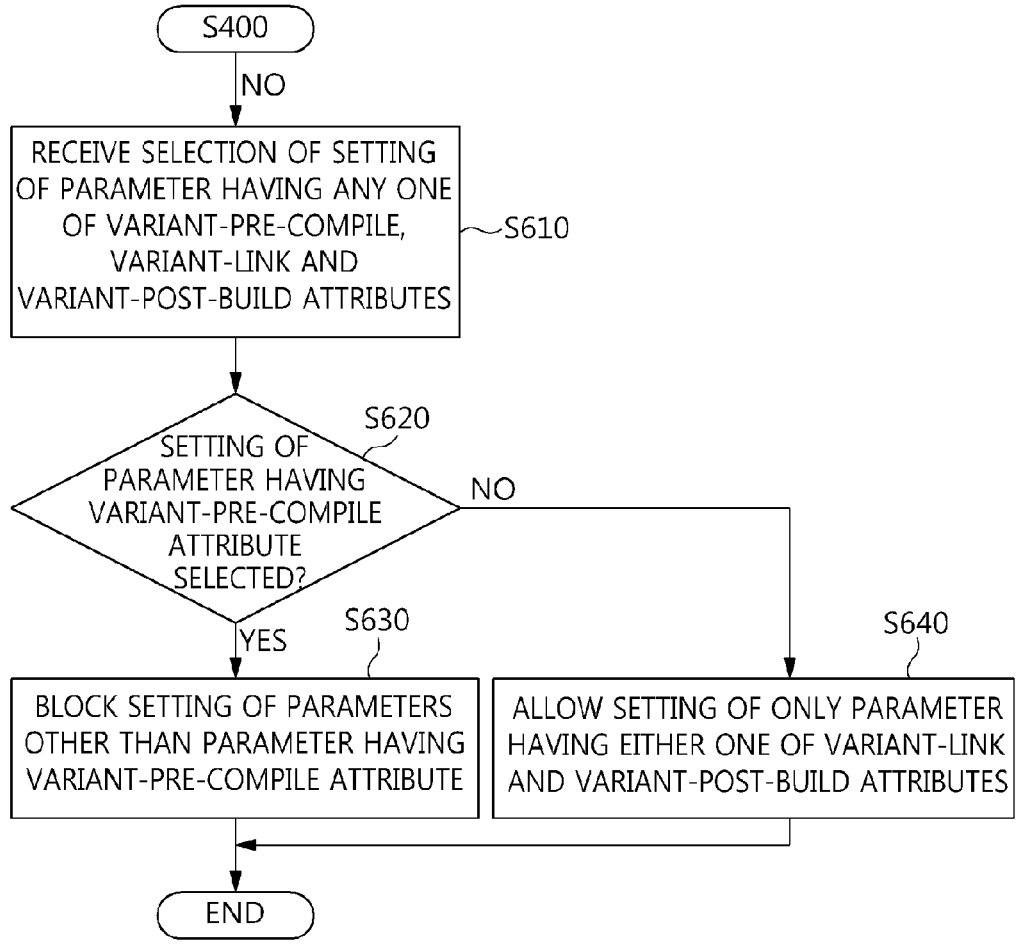

FIG. 5 is a flowchart showing step S600 of FIG. 3 in greater detail.

Referring to FIG. 5, step S600 is configured such that the user selection input unit 120 receives, from the user, a selection regarding which one of a parameter having a variant-pre-compile attribute, a parameter having a variant-link attribute, and a parameter having a variant-post-build attribute is to be set at step S610. In this case, the user selection input unit 120 transmits the selection of the setting of the parameter received from the user to the parameter setting selection determination unit 162 of the parameter setting management unit 160.

Next, the parameter setting selection determination unit 162 determines whether the selection of the setting of a parameter provided by the user selection input unit 120 corresponds to a selection of a setting of the parameter having the variant-pre-compile attribute at step S620.

If it is determined at step S620 that the selection of the setting of the parameter corresponds to the selection required to set the parameter having the variant-pre-compile attribute, the parameter setting blocking unit 166 allows the user to set only the parameter having the variant-pre-compile attribute, and blocks the user from setting a parameter having a variant-link attribute or a parameter having a variant-post-build attribute other than the parameter having the variant-pre-compile attribute at step S630.

If it is determined at step S620 that the selection of the setting of the parameter corresponds to the selection required to set a parameter having a variant-link attribute or a parameter having a variant-post-build attribute other than the parameter having the variant-pre-compile attribute, the parameter setting blocking unit 166 allows the user to set only the parameter having either one of the variant-link attribute and the variant-post-build attribute, and blocks the user from setting the parameter having the variant-pre-compile attribute at step S640.

Figure 6:
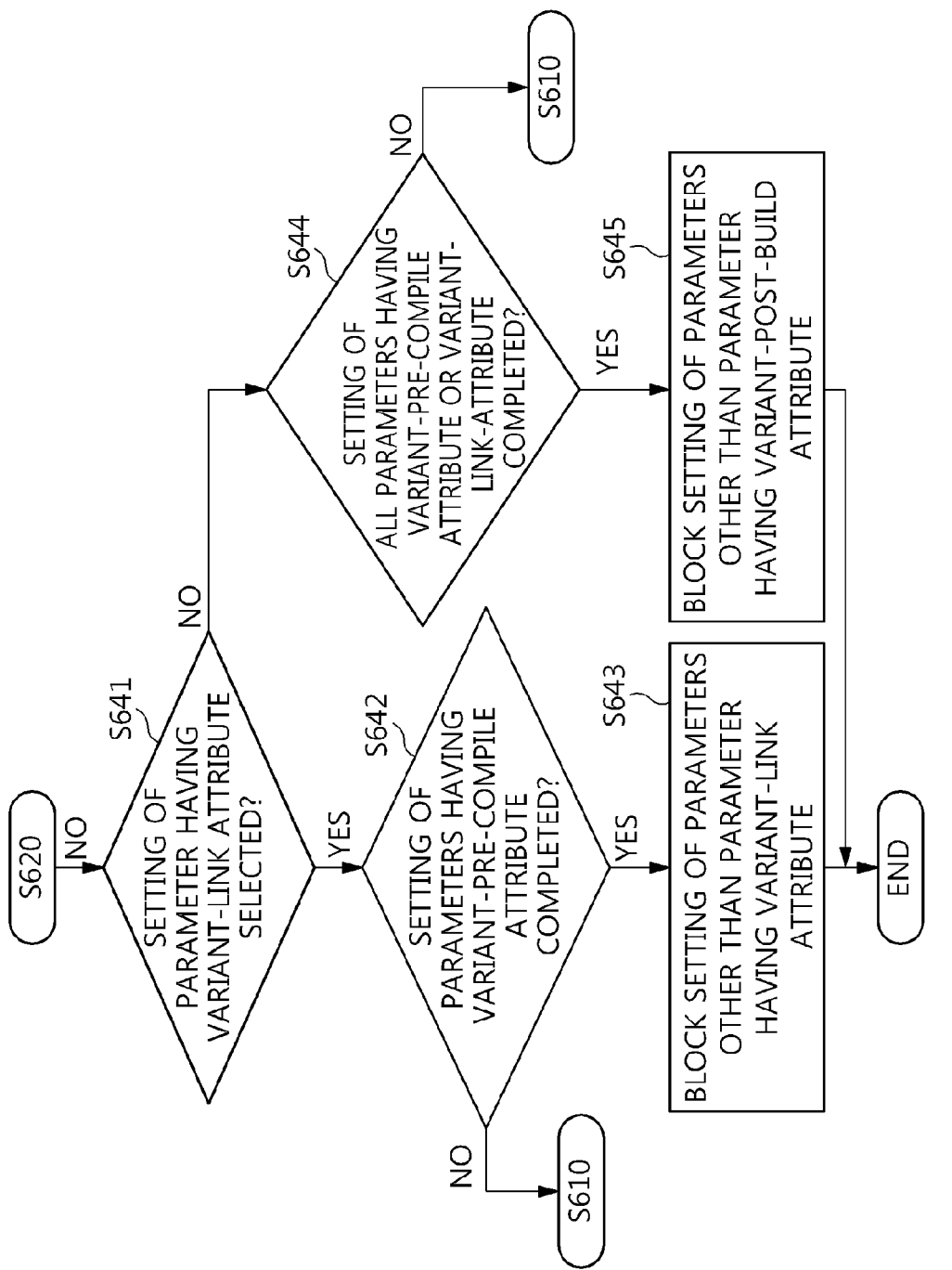

FIG. 6 is a flowchart showing step S640 of FIG. 5 in greater detail.

Referring to FIG. 6, step S640 is configured such that the parameter setting selection determination unit 162 first determines whether the selection of the setting of the parameter provided by the user selection input unit 120 corresponds to a selection of a setting of a parameter having a variant-link attribute at step S641.

If it is determined at step S641 that the selection of the setting of the parameter corresponds to the selection required to set the parameter having the variant-link attribute, the parameter setting completion checking unit 164 checks whether the setting of all parameters having the variant-pre-compile attribute has been completed at step S642. In this case, if it is checked at step S642 that the setting of all parameters having the variant-pre-compile attribute has not yet been completed, the parameter setting completion checking unit 164 warns the user that the setting of all parameters having the variant-pre-compile attribute has not yet been completed, and requests the user to complete the setting of all parameters having the variant-pre-compile attribute which has not yet been completed. In order to set the parameters having the variant-pre-compile attribute, the setting of which has not yet been completed, the step S610 of the user selection input unit 120 receiving, from the user, the selection regarding which one of the parameter having the variant-pre-compile attribute, the parameter having the variant-link attribute, and the parameter having the variant-post-build attribute is to be set may be performed again.

In contrast, if it is checked at step S642 that the setting of all parameters having the variant-pre-compile attribute has been completed, the parameter setting blocking unit 166 allows the user to set only the parameter having the variant-link attribute, and blocks the user from setting parameters having the variant-pre-compile attribute or the variant-post-build attribute other than the parameter having the variant-link attribute at step S643.

Meanwhile, if it is determined at step S641 that the selection of the setting of the parameter corresponds to the selection required to set the parameter having the variant-post-build attribute, the parameter setting completion checking unit 164 checks whether the setting of all parameters having the variant-pre-compile attribute or the variant-link attribute has been completed at step S644. In this case, if it is checked at step S644 that the setting of all parameters having the variant-pre-compile attribute or the variant-link attribute has not yet been completed, the parameter setting completion checking unit 164 warns the user that the setting of all parameters having the variant-pre-compile attribute or the variant-link attribute has not yet been completed, and requests the user to complete the setting of all parameters having the variant-pre-compile attribute or the variant-link attribute which has not yet been completed. In order to set the parameters having the variant-pre-compile attribute or the variant-link attribute, the setting of which has not yet been completed, the step S610 of the user selection input unit 120 receiving, from the user, the selection regarding which one of the parameter having the variant-pre-compile attribute, the parameter having the variant-link attribute, and the parameter having the variant-post-build attribute is to be set may be performed again.

In contrast, if it is checked at step S644 that the setting of all parameters having the variant-pre-compile attribute or variant-link attribute has been completed, the parameter setting blocking unit 166 allows the user to set only the parameter having the variant-post-build attribute, and blocks the user from setting parameters having the variant-pre-compile attribute or the variant-link attribute other than the parameter having the variant-post-build attribute at step S645.

In accordance with the present invention, there is the advantage of providing a parameter setting process for AUTOSAR-based software, which leads a user to set corresponding parameters at suitable time points depending on the variant attributes of parameters set by an AUTOSAR-supporting development tool.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A parameter setting method for Automotive Open System ARchitecture (AUTOSAR)-based software, comprising:
    receiving a selection of a variant attribute of a parameter of a metamodel defined to design AUTOSAR-based software from a user;
    if the variant attribute selected by the user corresponds to a variant-pre-compile attribute, allowing setting of only a parameter having the variant-pre-compile attribute;
    if the variant attribute selected by the user corresponds to a variant-link attribute, allowing setting of only a parameter having either one of the variant-pre-compile attribute and the variant-link attribute; and
    if the variant attribute selected by the user corresponds to a variant-post-build attribute, allowing setting of only a parameter having any one of the variant-pre-compile attribute, the variant-link attribute, and the variant-post-build attribute.

2. The parameter setting method of claim 1, wherein allowing the setting of only the parameter having either one of the variant-pre-compile attribute and the variant-link attribute comprises receiving a selection of a setting of the parameter having either one of the variant-pre-compile attribute and the variant-link attribute from the user.

3. The parameter setting method of claim 2, wherein allowing the setting of only the parameter having either one of the variant-pre-compile attribute and the variant-link attribute further comprises, if the selection of the setting of the parameter corresponds to a selection of a setting of the parameter having the variant-pre-compile attribute, blocking setting of parameters other than the parameter having the variant-pre-compile attribute.

4. The parameter setting method of claim 2, wherein allowing the setting of only the parameter having either one of the variant-pre-compile attribute and the variant-link attribute further comprises, if the selection of the setting of the parameter corresponds to a selection of a setting of the parameter having the variant-link attribute, checking whether setting of all parameters having the variant-pre-compile attribute has been completed.

5. The parameter setting method of claim 4, wherein allowing the setting of only the parameter having either one of the variant-pre-compile attribute and the variant-link attribute further comprises, if the setting of all parameters having the variant-pre-compile attribute has not yet been completed, requesting the user to set all parameters having the variant-pre-compile attribute.

6. The parameter setting method of claim 4, wherein allowing the setting of only the parameter having either one of the variant-pre-compile attribute and the variant-link attribute further comprises, if the setting of all parameters having the variant-pre-compile attribute has been completed, blocking setting of parameters other than the parameter having the variant-link attribute.

7. The parameter setting method of claim 1, wherein allowing the setting of only the parameter having any one of the variant-pre-compile attribute, the variant-link attribute, and the variant-post-build attribute comprises receiving a selection of a setting of the parameter having any one of the variant-pre-compile attribute, the variant-link attribute, and the variant-post-build attribute from the user.

8. The parameter setting method of claim 7, wherein allowing the setting of only the parameter having any one of the variant-pre-compile attribute, the variant-link attribute, and the variant-post-build attribute further comprises, if the selection of the setting of the parameter corresponds to a selection of a setting of the parameter having the variant-pre-compile attribute, blocking setting of parameters other than the parameter having the variant-pre-compile attribute.

9. The parameter setting method of claim 7, wherein allowing the setting of only the parameter having any one of the variant-pre-compile attribute, the variant-link attribute, and the variant-post-build attribute further comprises, if the selection of the setting of the parameter corresponds to a selection of a setting of the parameter having the variant-link attribute, checking whether setting of all parameters having the variant-pre-compile attribute has been completed.

10. The parameter setting method of claim 9, wherein allowing the setting of only the parameter having any one of the variant-pre-compile attribute, the variant-link attribute, and the variant-post-build attribute further comprises, if the setting of all parameters having the variant-pre-compile attribute has not yet been completed, requesting the user to set all parameters having the variant-pre-compile attribute.

11. The parameter setting method of claim 9, wherein allowing the setting of only the parameter having any one of the variant-pre-compile attribute, the variant-link attribute, and the variant-post-build attribute further comprises, if the setting of all parameters having the variant-pre-compile attribute has been completed, blocking setting of parameters other than the parameter having the variant-link attribute.

12. The parameter setting method of claim 7, wherein allowing the setting of only the parameter having any one of the variant-pre-compile attribute, the variant-link attribute, and the variant-post-build attribute further comprises, if the selection of the setting of the parameter corresponds to a selection of a setting of the parameter having the variant-post-build attribute, checking whether setting of all parameters having the variant-pre-compile attribute or the variant-link attribute has been completed.

13. The parameter setting method of claim 12, wherein allowing the setting of only the parameter having any one of the variant-pre-compile attribute, the variant-link attribute, and the variant-post-build attribute further comprises, if the setting of all parameters having the variant-pre-compile attribute or the variant link attribute has not yet been completed, requesting the user to set all parameters having the variant-pre-compile attribute or the variant-link attribute.

14. The parameter setting method of claim 12, wherein allowing the setting of only the parameter having any one of the variant-pre-compile attribute, the variant-link attribute, and the variant-post-build attribute further comprises, if the setting of all parameters having the variant-pre-compile attribute or the variant link attribute has been completed, blocking setting of parameters other than the parameter having the variant-post-build attribute.

15. A computer system including at least one processor and instructions recorded on a non-transitory computer-readable storage medium, the system instructions comprising a parameter setting apparatus for Automotive Open System ARchitecture (AUTOSAR)-based software, comprising:
a user selection input unit configured to receive a selection of a variant attribute of a parameter of a metamodel defined to design AUTOSAR-based software from a user; a variant selection determination unit configured to determine whether the variant attribute selected by the user corresponds to any one of a variant-pre-compile attribute, a variant-link attribute, and a variant-post-build attribute; and
a parameter setting management unit configured to, if the variant attribute selected by the user corresponds to the variant-pre-compile attribute, allow setting of only a parameter having the variant-pre-compile attribute, if the variant attribute selected by the user corresponds to the variant-link attribute, allow setting of only a parameter having either one of the variant-pre-compile attribute and the variant-link attribute, and if the variant attribute selected by the user corresponds to the variant-post-build attribute, allow setting of only a parameter having any one of the variant-pre-compile attribute, the variant-link attribute, and the variant-post-build attribute.

16. The computer system of claim 15, wherein the user selection input unit receives a selection of a setting of the parameter having any of the variant-pre-compile attribute, the variant-link attribute, and the variant-post-build attribute from the user.

17. The computer system of claim 16, wherein the parameter setting management unit comprises a parameter setting selection determination unit for determining whether the selection of the setting of the parameter corresponds to a selection of a setting of the parameter having any one of the variant-pre-compile attribute, the variant-link attribute, and the variant-post-build attribute.

18. The computer system apparatus of claim 17, wherein the parameter setting management unit further comprises a parameter setting completion checking unit configured to, if the selection of the setting of the parameter corresponds to a selection of a setting of the parameter having the variant-link attribute, check whether setting of all parameters having the variant-pre-compile attribute has been completed, and if the selection of the setting of the parameter corresponds to a selection of a setting of the parameter having the variant-post-build attribute, check whether setting of all parameters having the variant-pre-compile attribute or the variant-link attribute has been completed.

19. The computer system apparatus of claim 18, wherein the parameter setting completion checking unit is configured to, if the selection of the setting of the parameter corresponds to the selection of the setting of the parameter having the variant-link attribute, and setting of all parameters having the variant-pre-compile attribute has not yet been completed, request the user to set all parameters having the variant-pre-compile attribute, and if the selection of the setting of the parameter corresponds to the selection of the setting of the parameter having the variant-post-build attribute, and setting of all parameters having the variant-pre-compile attribute or the variant-link attribute has not yet been completed, request the user to set all parameters having the variant-pre-compile attribute or the variant-link attribute.

20. The computer system apparatus of claim 18, wherein the parameter setting management unit further comprises a parameter setting blocking unit for blocking setting of parameters other than a parameter having a corresponding variant attribute depending on the selection of the setting of the parameter.

* * * * *